US012345212B2

(12) United States Patent
Paulino et al.

(10) Patent No.: US 12,345,212 B2
(45) Date of Patent: Jul. 1, 2025

(54) TURBINE ENGINE WITH AUXILIARY COOLANT INJECTION

(71) Applicant: RTX CORPORATION, Farmington, CT (US)

(72) Inventors: Jose R. Paulino, Jupiter, FL (US); Steven W. Burd, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/515,400

(22) Filed: Nov. 21, 2023

(65) Prior Publication Data

US 2025/0163856 A1 May 22, 2025

(51) Int. Cl.
*F02C 9/00* (2006.01)
*F02C 7/18* (2006.01)
*F02C 9/28* (2006.01)

(52) U.S. Cl.
CPC . *F02C 9/28* (2013.01); *F02C 7/18* (2013.01)

(58) Field of Classification Search
CPC ................. F02C 9/28; F02C 7/18; F02C 3/20
See application file for complete search history.

(56) References Cited

U.S. PATENT DOCUMENTS

| 6,502,403 B1 * | 1/2003 | Tazaki ...................... F02C 7/16 60/39.55 |
| 9,739,200 B2 | 8/2017 | Vaisman |
| 10,961,911 B2 | 3/2021 | Bintz et al. |
| 2013/0061600 A1 | 3/2013 | Anand et al. |
| 2018/0238235 A1 * | 8/2018 | Dailey ...................... F02C 3/30 |
| 2020/0407072 A1 | 12/2020 | Stoia et al. |

FOREIGN PATENT DOCUMENTS

| CN | 112031938 B | 6/2021 |
| CN | 113153537 B | 5/2022 |

OTHER PUBLICATIONS

Extended European Search Report for European Application No. 24214627.2 mailed Apr. 4, 2025.

* cited by examiner

*Primary Examiner* — Katheryn A Malatek
(74) *Attorney, Agent, or Firm* — Carlson, Gaskey & Olds, P.C.

(57) ABSTRACT

An aircraft propulsion system includes a core engine that includes a core flow path where air is compressed in a compressor section, communicated to a combustor section, mixed with fuel, and ignited to generate a gas flow that is expanded through a turbine section. A coolant is stored in a coolant chamber and is distributed to a location within the core flow path of the engine through a coolant flow regulator during engine operation.

15 Claims, 6 Drawing Sheets

TURBINE ENGINE WITH AUXILIARY COOLANT INJECTION

TECHNICAL FIELD

The present disclosure relates generally to a turbine engine with an auxiliary coolant supply to supplement cooling.

BACKGROUND

Propulsion systems, like gas turbine engines, are designed for transient operation and other operational conditions that thermally and structurally challenge hot sections, such as combustor and turbine sections, due to excessive air temperatures in the main flow, cooling flow and from combustion. Excessive temperatures encountered during operation may limit the operational life of engine components, impact performance and limit achievable ranges and speeds.

SUMMARY

An aircraft propulsion system according to an exemplary embodiment of this disclosure includes, among other possible things, a core engine that includes a core flow path where air is compressed in a compressor section, communicated to a combustor section, mixed with fuel, and ignited to generate a gas flow that is expanded through a turbine section, a coolant chamber where a quantity of coolant is stored, and at least one coolant flow regulator for distributing coolant from the coolant chamber to a location within the core flow path of the engine.

In a further embodiment of the foregoing aircraft propulsion system, the combustor section includes one of an axial flow combustor or a reverse flow combustor.

In a further embodiment of any of the foregoing aircraft propulsion systems, the coolant chamber includes a plurality of coolant chambers that are in communication with a manifold for distribution of coolant.

In a further embodiment of any of the foregoing aircraft propulsion systems, coolant that is distributed into the core flow path is exhausted from the core engine during operation.

In a further embodiment of any of the foregoing aircraft propulsion systems, the at least one coolant flow regulator controls a flow of coolant from the coolant chamber to a diffuser that is disposed about the combustor.

In a further embodiment of any of the foregoing aircraft propulsion systems, the at least one coolant flow regulator includes a first coolant flow regulator that controls a first flow of coolant to a first location within the turbine section.

In a further embodiment of any of the foregoing, the aircraft propulsion system further includes a second coolant flow regulator that controls a second flow of coolant from the coolant chamber to a second location within the turbine section.

In a further embodiment of any of the foregoing, the aircraft propulsion system includes a controller that is programed to operate the at least one coolant flow regulator based on a predefined operation profile.

In a further embodiment of any of the foregoing aircraft propulsion systems, the predefined operation profile includes a first operating period where no coolant is distributed from the coolant chamber followed by at least one second operating period where coolant is supplied to the location within the core flow path.

In a further embodiment of any of the foregoing aircraft propulsion systems, the predefined operation profile includes a third operating period after the quantity of coolant in the chamber is exhausted.

In a further embodiment of any of the foregoing aircraft propulsion systems, the predefined operation profile includes a first operating period where no coolant is distributed from the coolant chamber followed by a plurality of second operating periods where coolant is supplied to the location within the core flow path.

In a further embodiment of any of the foregoing aircraft propulsion systems, the controller is programmed to operate the at least one coolant flow regulator to distribute coolant flow into the location within the core flow path based on a monitored engine operating condition.

In a further embodiment of any of the foregoing aircraft propulsion systems, the monitored engine operating condition includes at least one of a temperature within the combustor and/or a temperature within the turbine section.

In a further embodiment of any of the foregoing aircraft propulsion systems, the coolant includes a compound that is in a gas form at operating temperature and pressure within the core engine.

A propulsion system according to another exemplary embodiment of this disclosure includes, among other possible things, a core engine that includes a core flow path where air is compressed in a compressor section, communicated to a combustor section, mixed with fuel, and ignited to generate a gas flow that is expanded through a turbine section, a fuel storage tank where the fuel utilized in the combustor section is stored, a coolant chamber where a quantity of coolant is stored, at least one coolant flow regulator for distributing coolant from the coolant chamber to a location within the core flow path of the core engine, and a controller that is programed to operate the at least one coolant flow regulator based on a predefined operation profile.

In a further embodiment of the foregoing propulsion system, the predefined operation profile includes a first operating period where no coolant is distributed from the cooling chamber followed by at least one second operating period where coolant is supplied to the location with the core flow path.

In a further embodiment of any of the foregoing propulsion systems, the controller is programmed to operate the at least one coolant flow regulator to distribute coolant flow into the location within the core flow path based on a monitored engine operating condition.

A method of operating a propulsion system according to another exemplary embodiment of this disclosure includes, among other possible things, generating an exhaust gas flow with a core engine that includes a core flow path where air is compressed in a compressor section, communicated to a combustor section, mixed with fuel, and ignited to generate a gas flow that is expanded through a turbine section, and injecting a coolant flow from a coolant chamber into the core flow path according to a predefined operation profile to maintain an operating temperature within a desired operating range at an increased power output.

In a further embodiment of the foregoing, the method further includes operating the propulsion system at a first operating period where no coolant is distributed from the cooling chamber followed by at least one second operating period where the coolant flow is injected into the core flow path.

In a further embodiment of any of the foregoing, the method further includes exhausting the cooling flow that is injected into the core flow path from the propulsion system with the gas flow.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
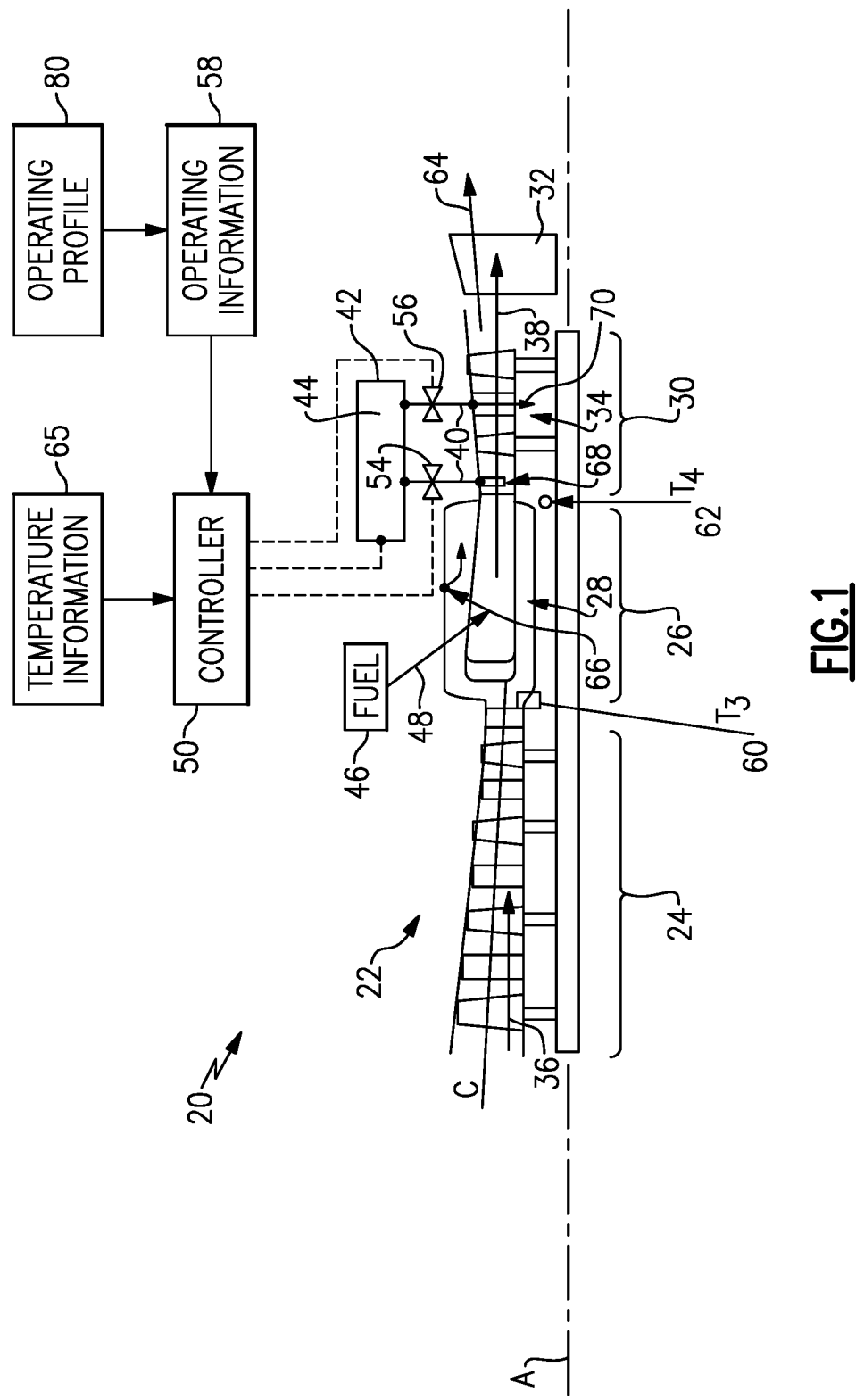
FIG. 1 is a schematic view of an example propulsion system embodiment.

FIG. 1 schematically illustrates an example propulsion system 20 that includes a defined amount of coolant for cooling portions of a core engine 22 to maintain operating temperatures within defined limits for limited periods of operation.

The example propulsion system 20 includes a core engine 22 having a compressor 24, combustor 26, and turbine 30 disposed along an engine longitudinal axis A. Inlet airflow 36 is directed along a core flow path C where it is compressed in the compressor 24, mixed with fuel 48 and ignited in the combustor 28 to generate a high energy exhaust gas flow 38 that is expanded through the turbine 30 to generate shaft power utilized to drive the compressor 24 and generate propulsive thrust. Compressed air from the compressor 24 is communicated through a diffuser 28 to the combustor 26. A fuel tank 46 stores a quantity of fuel provided to combustor 26 during operation. Expelled exhaust gas flow 38 is exhausted to the atmosphere through a nozzle 32.

A coolant chamber 42 holds a quantity of coolant 44 for injection into different locations along the core flow path C. Injection of coolant 44 maintains temperatures within the core engine 22 within operating limits to enable periods of high power, thrust generation during periods of transient cooling demands. The amount of coolant 44 within the coolant chamber 42 is finite and exhausted during engine operation.

A flow 40 of coolant injected into the core flow path C is controlled by at least one coolant flow regulator. A first coolant flow regulator 54 controls coolant flow to a first location within the turbine 30. In one example embodiment, the first location is a turbine inlet that is indicated schematically at 68. A second coolant flow regulator 56 controls coolant flow to a second location within the turbine 30. In one example embodiment, the second location is a turbine cavity that is schematically indicated at 70.

Each of the coolant flow regulators 54 and 56 are controlled by a controller 50. The example controller 50 is a device and system for performing necessary computing or calculation operations of the coolant flow regulator 54 and 56. The controller 50 may be specially constructed for operation of the regulators 54, and 56 or it may comprise at least a general-purpose computer selectively activated or reconfigured by software instructions stored in a memory device. The controller 50 may further be part of full authority digital engine control (FADEC), an electronic engine controller (EEC), engine interface unit (EIU) or other air vehicle control software.

In one example disclosed embodiment, the controller 50 operates the coolant flow regulators 54 and 56 based on operating information 58. The operating information 58 may include a predefined operation profile 80. The operation profile 80 may define the power output of the propulsion system 20 and when the coolant 44 is injected into locations within the core engine 22.

In one example embodiment, the operating profile 80 includes a first operating period where no coolant 44 is distributed from the coolant chamber 42. The first operating period may include operation during take-off and during initial flight. During a second operating period, coolant 44 may be injected into the core engine 22 to enable increased power output.

After the coolant 44 has been exhausted, the propulsion system 20 enters a third operating period where power output may be reduced to maintain temperatures within defined operating limits. The reduced power output provides for operation at lower temperatures and speeds while enabling increased operational duration.

The injection of coolant 44 into the core engine 22 may alternatively be initiated based on engine operating parameters, such as temperature. In one example disclosed embodiment, the controller 50 receives temperature information 65 and operates the regulators 54 and 56 to inject coolant 44 in response to a measured a value indicative of a temperature reaching a predefined threshold.

The measured value may be a directly measured temperature such as is provide by a first temperature sensor 60 and a second temperature sensor 62. In the disclosed example embodiment, the first temperature sensor 60 provides information indicative of a T3 temperature at an inlet to the combustor 26. The second temperature sensor 62 provides information indicative of a T4 temperature at the turbine inlet 68. It should be appreciated that other and additional engine measurements and temperatures indicative of engine operation may also be communicated to the controller 50 and utilized to determine when coolant 44 should be injected into the core engine 22.

In one example operational embodiment, the propulsion system 20 is operated without any coolant injection during low speed operation. As power output and speeds are increased, coolant 44 is injected into the core engine 22. The coolant 44 may be injected directly into the core flow path C to provides cooling and is exhausted as indicated by arrow 64 through the nozzle 32. The coolant 44 is not reclaimed or otherwise returned to the coolant chamber 42.

During injection of the coolant 44, the power output capacity of the propulsion system 20 is increased due to the cooling provided. The coolant 44 provides an increased capacity for power output of the propulsion system 20 without a corresponding increase in engine operating temperature. Once the coolant 44 is exhausted, the capacity of the propulsion system 20 to produce power and remain within operating temperature limitations is returned to non-coolant injection conditions.

The amount of coolant 44 stored in the coolant chamber 42 is determined based on a desired operating profile and duration. The amount of coolant 44 carried in the coolant chamber 42 provides limited operation at high power outputs that is tailored to specific applications.

Figure 2:
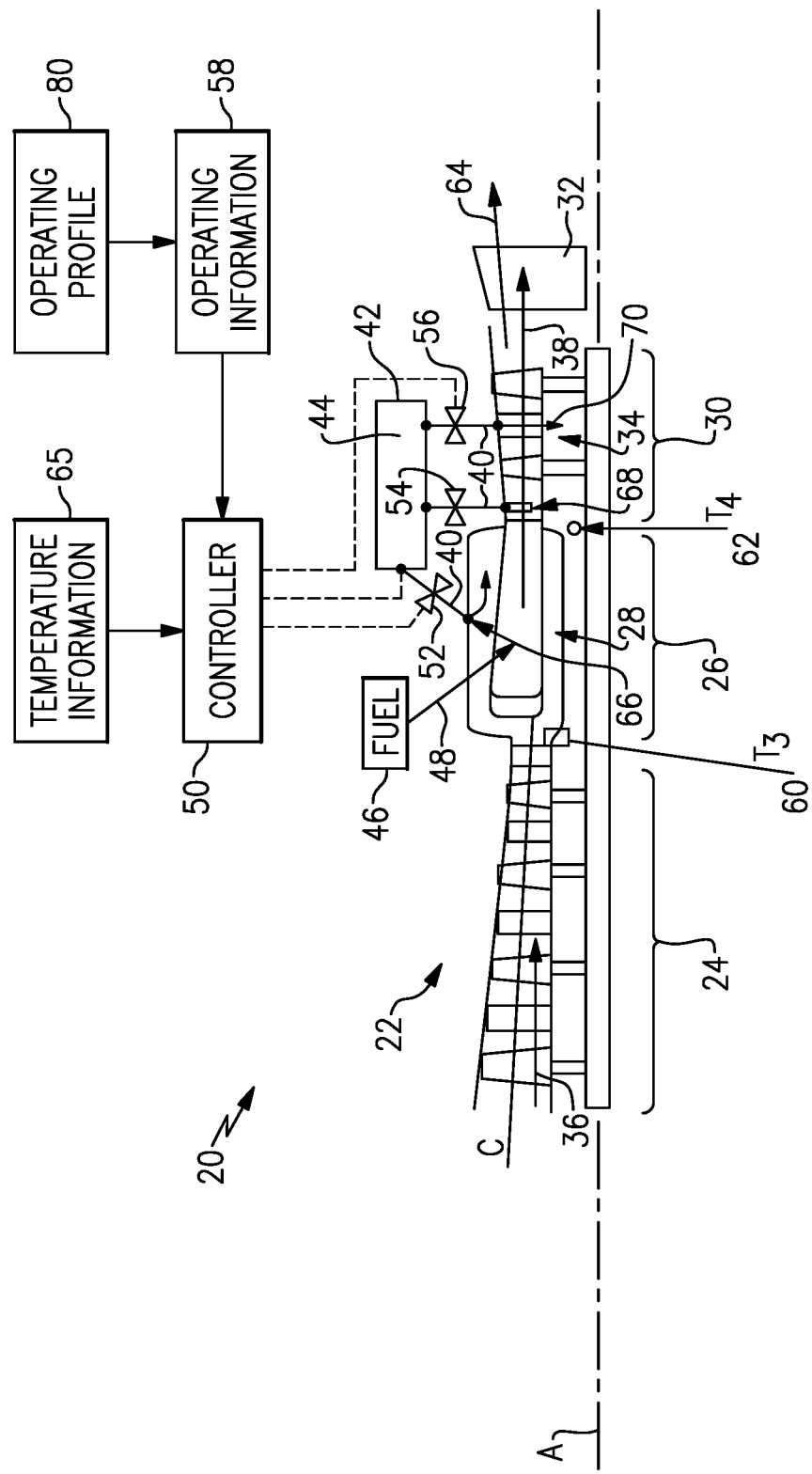
FIG. 2 is a schematic view of another example propulsion system embodiment.

Referring to FIG. 2 with continued reference to FIG. 1, the example propulsion system 20 is illustrated schematically and includes an additional coolant flow regulator 52 that controls coolant flow to a location 66 around the combustor 26. In the disclosed example, the first the location 66 is within the diffuser 28.

The regulators 52, 54, and 56 may operate proportionally or as an on/off valve. The example regulators 52, 54, and 56 are schematically shown and may be configured in any manner that provides injection at the desired locations. Moreover, each of the example regulators 52, 54 and 56 would be configured to communicate coolant 44 from the coolant chamber 42 through conduits, valving, accumulators, manifolds, and any other coolant transfer devices and structures as may be necessary to facilitate operation.

Moreover, although each of the example regulators 52, 54 and 56 are illustrated schematically as a single device, multiple regulators may be utilized and arranged circumferentially about the core engine 22. The multiple regulators may be controlled individually or in groups to provides further control to target specific locations within the core engine for cooling.

Injection of the coolant 44 into the core engine 22 may be performed proportionally, all at once or in some combination. Moreover, coolant 44 may be turned on and off to correspond with intermittent periods of increased power output and normal power output. Additionally, coolant 44 may be injected through all, one or some combination of the regulators 52, 54, and 56 to tailor power output to a specific flight profile.

Figure 3:
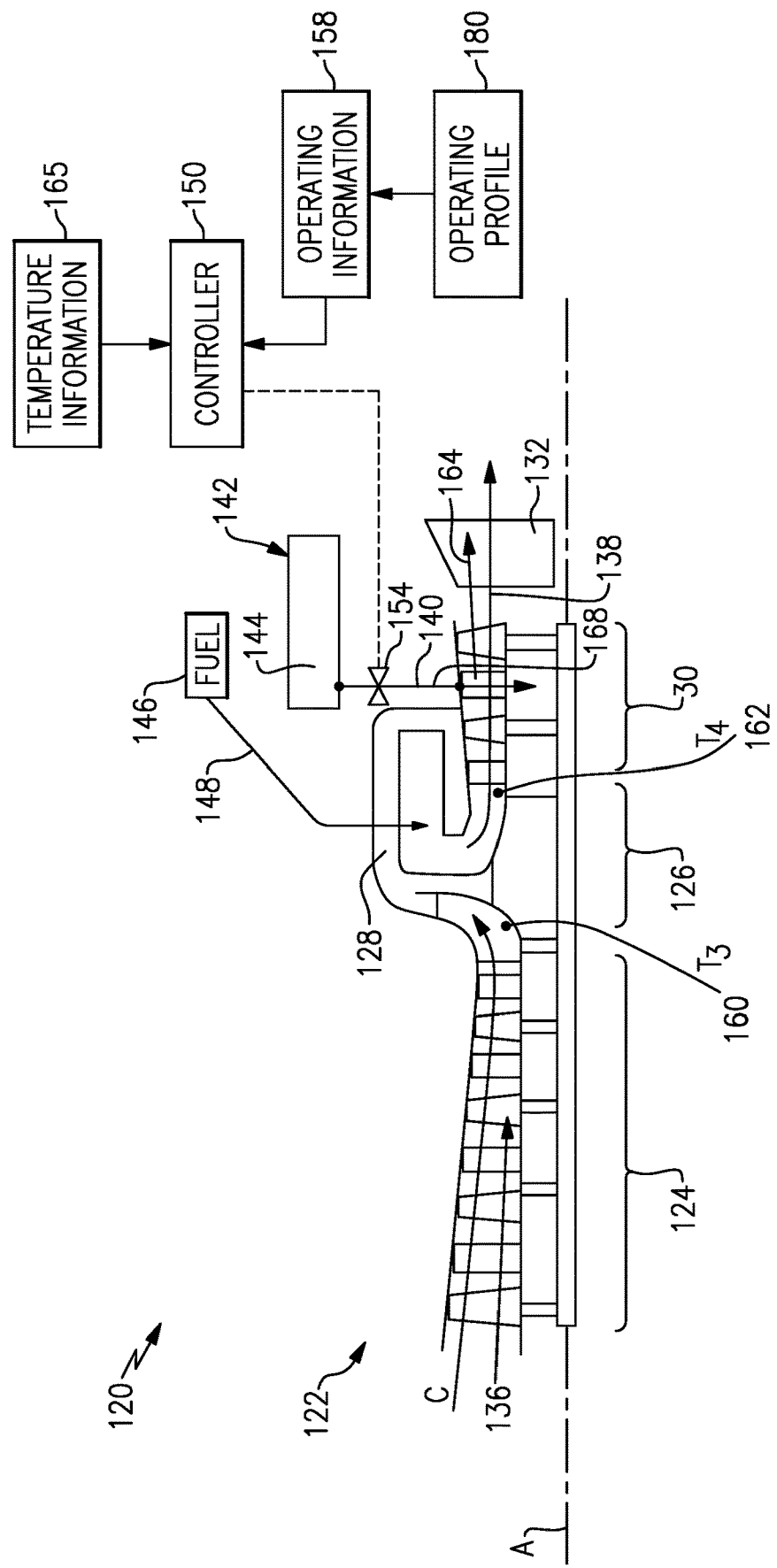
FIG. 3 is a schematic view of yet another example propulsion system embodiment.

Referring to FIG. 3, another example propulsion system 120 is schematically shown and includes a core engine 122 with a reverse flow combustor 126. The propulsion system 120 includes similar features to those described with regard to the propulsion system 20. The core engine 122 includes a compressor 124 through which a core flow 136 is compressed and communicated through a diffuser 128 to the combustor 126. In the combustor 126, fuel 148 from a fuel tank 146 is mixed with the compressed core flow 136 and ignited to generate an exhaust gas flow 138. The exhaust gas flow 138 is expanded through a turbine 130 and expelled through nozzle 132.

Although two core engine architectures are shown and disclosed by way of example, other engine architectures could be utilized, and are within the contemplation and scope of this disclosure.

A coolant chamber 142 holds a quantity of coolant 144 for injection into the core engine 122. A coolant flow regulator 154 controls coolant flow 140 and injection into the turbine 130. A controller 150 uses a combination of operating information 158 and temperature information 165 to control operation of the coolant flow regulator 154. The temperature information 165 may be provided by temperature sensors 160 and 162 that provide information indicative of T3 and T4 temperatures, respectively. The operating information 158 may include a predefined operating profile 180.

Coolant 144 is injected into the core engine 122 to enable increased power output capacity while remaining with operating temperature limitations. In one example embodiment, coolant from the coolant flow regulator 154 is injected into the turbine cavity as schematically shown at 168. Coolant injected into the core engine 122 is exhausted through the nozzle 132 as schematically shown by arrow 164. Once the coolant 144 is exhausted, engine operation returns to normal power output levels within the operating temperature limitations.

The injection of coolant 144 into the core engine 122 enables a finite period of increased power output without adding additional systems and weight. Moreover, without additional structures and systems utilized to generate increased power, more fuel can be carried to provide increased operational range.

The coolant 144 may be of any type compatible with engine operation and the environment within which the propulsion system 120 operates. In one example embodiment, the coolant 144 is nitrogen and stored in the coolant chamber 142 as a liquid. The liquid nitrogen transforms into a gaseous form as it is injected and eventually exhausted to the atmosphere. Although nitrogen is disclosed by way of example, other coolants could be utilized and are within the contemplation and scope of this disclosure.

Figure 4:
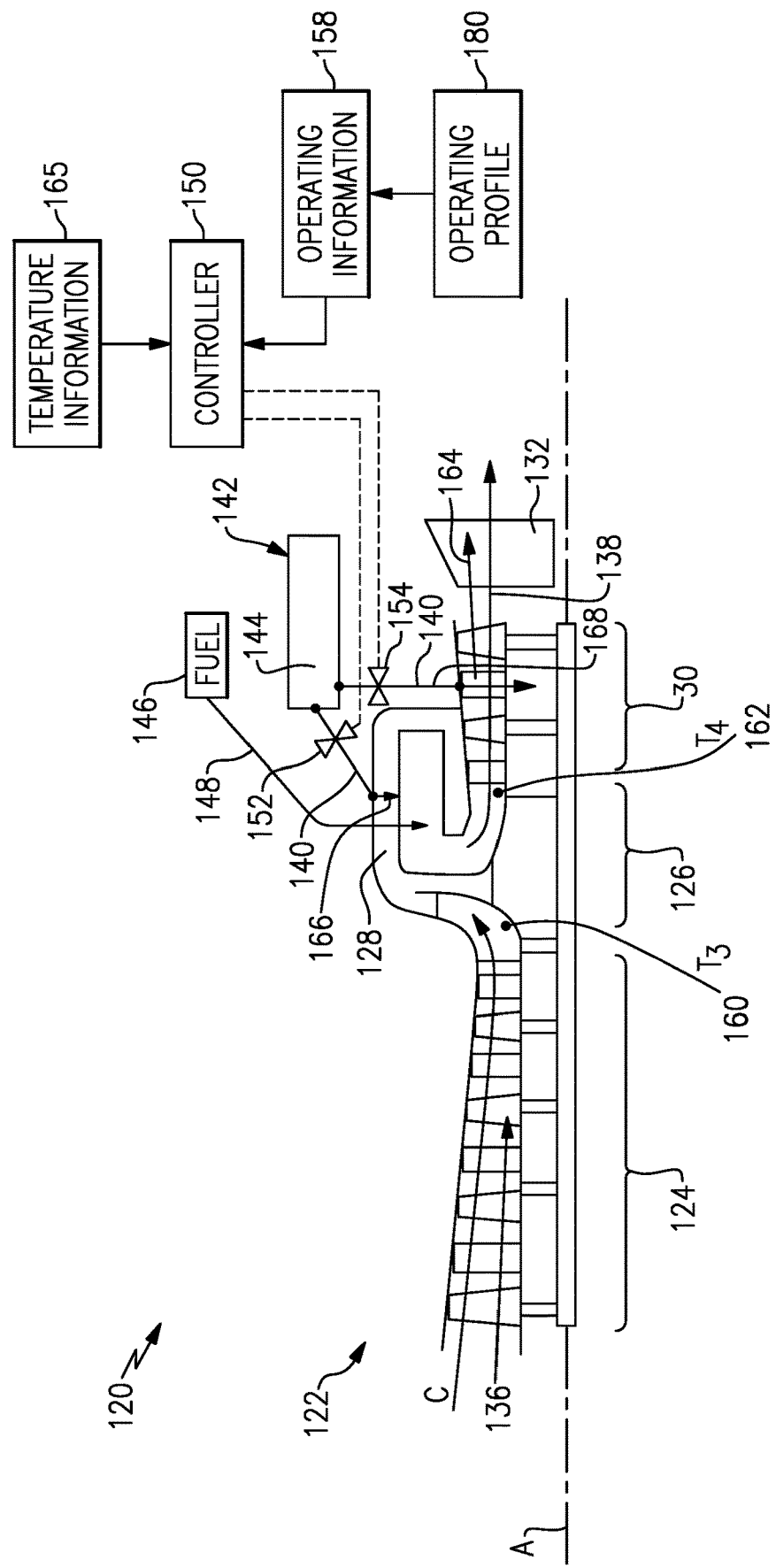
FIG. 4 is a schematic view of still another example propulsion system embodiment.

Referring to FIG. 4 with continued reference to FIG. 3, another flow of coolant 140 is controlled by a coolant flow regulator 152 for injection into the diffuser 128 as schematically indicated at 166. Coolant may be injected into different locations of the core engine 122 to tailor and target cooling based on specific engine architecture and operating conditions.

The controller 150 operates the regulators 152, 154 based on received information indicative of engine operation and/or a desired flight profile. In one example embodiment, the controller 150 uses temperature information 165, operating information 158 and an operating profile 180 as the basis for operation of the regulators 152, 154. Other factors, information and profiles may also be utilized by the controller 150.

Figure 5:
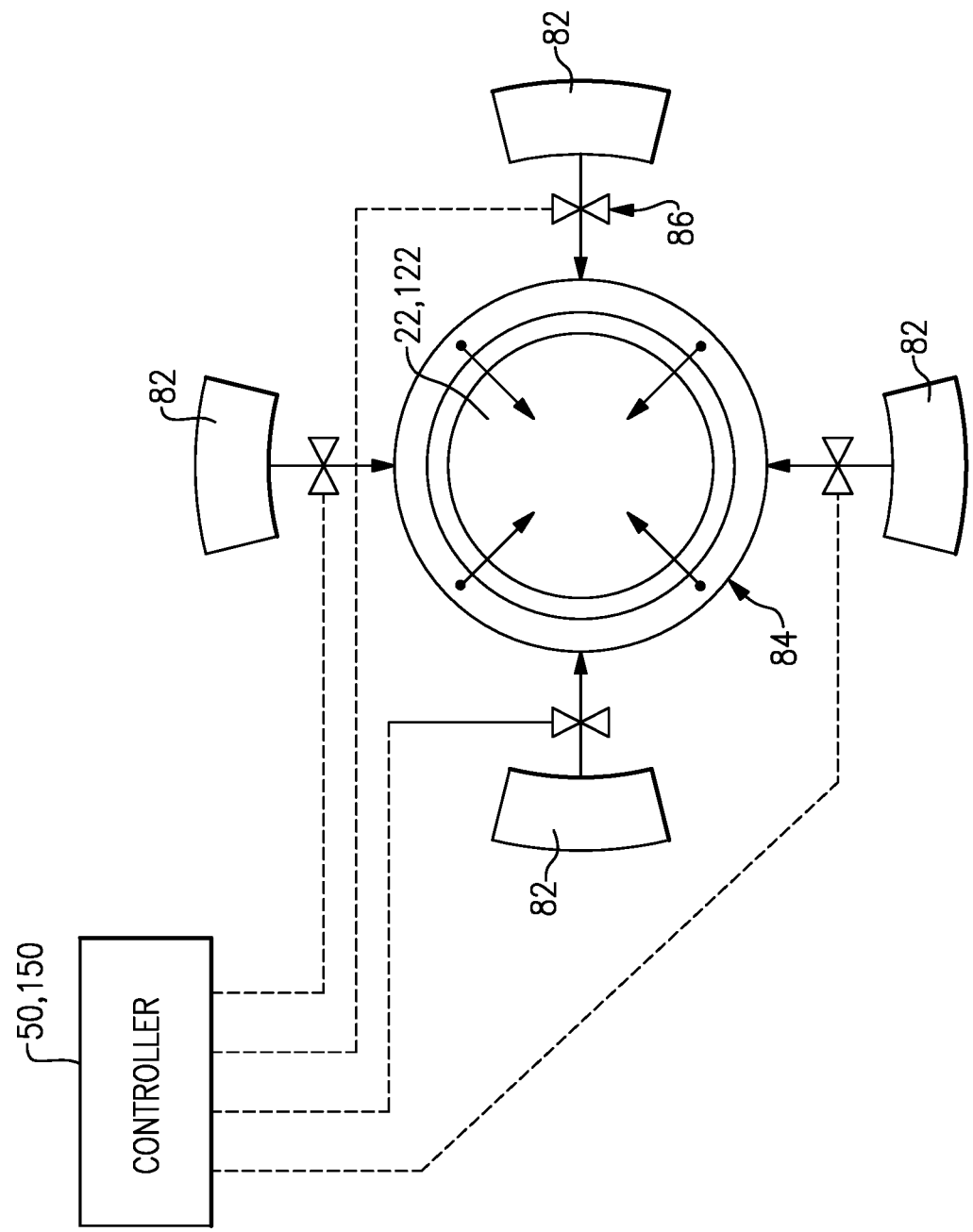
FIG. 5 is a schematic view of an example cooling cavity embodiment.

Referring to FIG. 5, several coolant chambers 82 are shown arranged about a circumference of the core engine 22, 122. The coolant chamber 42 was shown schematically in FIGS. 1-4 as a single chamber. However, coolant may be stored in several coolant chambers 82 arranged relative to the core engine 22, 122 as schematically shown in FIG. 5. Multiple coolant chambers 82 may provide for additional coolant to be carried and also enable adaptation to different engine and aircraft architectures. Accordingly, a single coolant chamber or multiple coolant chambers may be utilized within the scope and contemplation of this disclosure.

In the example shown in FIG. 5, each of the coolant chambers 82 communicate coolant to an annular manifold 84 for distribution of coolant. Coolant communicated to the annular manifold 84 is then communicate to locations within the core engine 22, 122. The locations within the core engines 22, 122 may be at any location desired to tailor cooling to improve cooling and thereby provide increased power generation. Although a single manifold 84 is shown by way of example, several manifolds may be utilized to supply coolant to locations within the core engine 22, 122. Additionally, it is within the contemplation and scope of this disclosure to use additional conduits, accumulators and other fluid control and communication structures could be utilized to direct coolant flow to locations within the core engine 22, 122.

Figure 6:
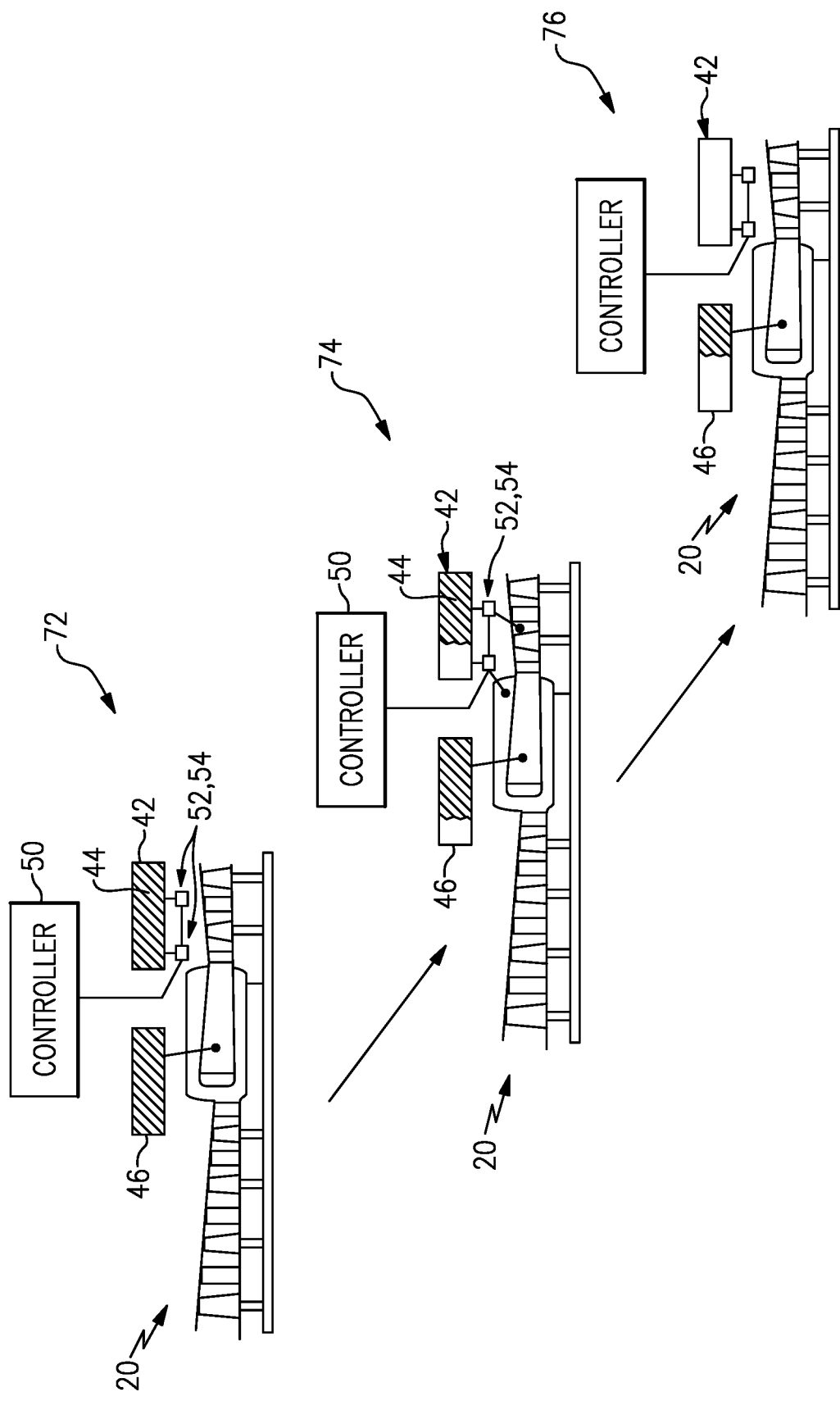
FIG. 6 is a schematic view of an example operating profile embodiment.

Referring to FIG. 6, an operational embodiment of the example propulsion system 20 is schematically shown and includes example first, second and third operating periods 72, 74 and 76.

During the first operating period 72, the propulsion system 20 operates without the injection of coolant 44. Fuel 48 from the fuel tank 46 is burned to generate thrust and the engine power output is maintained within operating temperature limits by constraining power output. In the first operating period 72, the propulsion system 20 generates power to facilitate take-off followed by sub-sonic and low speed operation.

During the second operating period 74, coolant 44 is injected into the core engine 22 to enable increased power output while maintaining temperatures within operating limits. The second operating period 74 may proceed for a predefined time, or until all of the coolant 44 is exhausted.

Although a single second operating period 74 is shown by way of example, coolant may be injected into the core engine 22 over several different discrete operating periods. For example, coolant 44 may be injected over a defined period then stopped before all of the coolant 44 is exhausted. Coolant 44 may than be injected again to provide cooling. Accordingly, several operating periods where coolant 44 is injected may be utilized and is within the contemplation and scope of this disclosure.

Once the coolant 44 is exhausted, the third operating period 76 is commenced. In the third operating period 76, power output is constrained to hold engine operating temperatures within defined operating ranges without the aid of the coolant 44. Operation within the third operating period 76 provides for operation at power and thrust levels that are within the limits of the propulsion system architecture without the addition of the coolant 44.

Although the example operating profile illustrates operation until all of the coolant 44 is exhausted, other operating conditions and profiles may turn off coolant flow based on a predefined operating conditions other than simply exhaustion of all of the coolant 44.

Moreover, although an operating profile is disclosed by way of example, other operating profiles may operate in a different order and/or includes different periods. For example, operation with coolant injection and without coolant injection may be alternated to provide additional periods of high power output operation. Moreover, other flight profiles that incorporate that increased power output provided by the coolant injection could be utilized and are within the contemplation and scope of this disclosure.

Accordingly, the disclosed example propulsion systems 20, 120 enable increased power output for limited periods utilizing a defined amount of coolant for cooling portions of a core engine. Moreover, the example propulsion systems enable additional fuel load to increase operating range.

Although an example engine configuration is described by way of example, it will be appreciated that other engine configurations may include additional structures and features and are within the contemplation and scope of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
a core engine including a core flow path where air is compressed in a compressor section, communicated to a combustor section, mixed with fuel, and ignited to generate a gas flow that is expanded through a turbine section;
a coolant chamber where a quantity of coolant is stored;
at least one coolant flow regulator for distributing the coolant from the coolant chamber to a location within the core flow path of the core engine;
a controller programed to operate the at least one coolant flow regulator based on a predefined operation profile, wherein the predefined operation profile includes a first operating period where no coolant is distributed from the coolant chamber followed by at least one second operating period where the coolant is supplied to the location within the core flow path, and a third operating period after the quantity of the coolant in the chamber is exhausted.

2. The aircraft propulsion system as recited in claim 1, wherein the combustor section comprises one of an axial flow combustor or a reverse flow combustor.

3. The aircraft propulsion system as recited in claim 1, wherein the coolant chamber comprises a plurality of coolant chambers in communication with a manifold for distribution of the coolant.

4. The aircraft propulsion system as recited in claim 1, wherein the coolant distributed into the core flow path is exhausted from the core engine during operation.

5. The aircraft propulsion system as recited in claim 1, wherein the at least one coolant flow regulator controls a flow of the coolant from the coolant chamber to a diffuser disposed about the combustor.

6. The aircraft propulsion system as recited in claim 1, wherein the location includes a first location in the turbine section;
wherein the at least one coolant flow regulator comprises a first coolant flow regulator controlling a first flow of the coolant to the first location.

7. The aircraft propulsion system as recited in claim 6, wherein the location further includes a second location in the turbine section;
wherein the at least one flow regulator further comprises a second coolant flow regulator controlling a second flow of the coolant from the coolant chamber to the second location.

8. The aircraft propulsion system as recited in claim 1, wherein the at least one second operating periods includes a plurality of second operating periods.

9. The aircraft propulsion system as recited in claim 1, wherein the controller is programmed to operate the at least one coolant flow regulator to distribute coolant flow into the location within the core flow path based on a monitored engine operating condition.

10. The aircraft propulsion system as recited in claim 9, wherein the monitored engine operating condition comprises at least one of a temperature within the combustor and/or a temperature within the turbine section.

11. The aircraft propulsion system as recited in claim 1, wherein the coolant comprises a compound that is in a gas form at operating temperature and pressure within the core engine.

12. An aircraft propulsion system comprising:
a core engine including a core flow path where air is compressed in a compressor section, communicated to a combustor section, mixed with fuel, and ignited to generate a gas flow that is expanded through a turbine section;
a fuel storage tank where the fuel utilized in the combustor section is stored;
a coolant chamber where a quantity of coolant is stored;
at least one coolant flow regulator for distributing the coolant from the coolant chamber to a location within the core flow path of the core engine; and a controller programed to operate the at least one coolant flow regulator based on a predefined operation profile, wherein the predefined operation profile includes a first operating period where no coolant is distributed from the coolant chamber followed by at least one second operating period where the coolant is supplied to the location within the core flow path, and a third operating period after the quantity of coolant in the chamber is exhausted.

13. The propulsion system as recited in claim 12, wherein the controller is programmed to operate the at least one coolant flow regulator to distribute a coolant flow into the location within the core flow path based on a monitored engine operating condition.

14. A method of operating an aircraft propulsion system comprising:
   generating an exhaust gas flow with a core engine including a core flow path where air is compressed in a compressor section, communicated to a combustor section, mixed with fuel, and ignited to generate a gas flow that is expanded through a turbine section; and
   injecting a coolant flow from a coolant chamber via at least one coolant flow regulator into the core flow path according to a predefined operation profile to maintain an operating temperature within an operating range, wherein the predefined operating profile includes a first operating period where no coolant is distributed from the coolant chamber followed by at least one second operating period where coolant is supplied to the location within the core flow path, and a third operating period after the quantity of coolant in the chamber is exhausted.

15. The method as recited in claim 14, further comprising exhausting the cooling flow injected into the core flow path from the propulsion system with the gas flow.

\* \* \* \* \*